US011750711B1

(12) United States Patent
Philipson et al.

(10) Patent No.: US 11,750,711 B1
(45) Date of Patent: Sep. 5, 2023

(54) SYSTEMS AND METHODS FOR ADAPTIVELY RATE LIMITING CLIENT SERVICE REQUESTS AT A BLOCKCHAIN SERVICE PROVIDER PLATFORM

(71) Applicant: Alchemy Insights, Inc., San Francisco, CA (US)

(72) Inventors: David Philipson, San Francisco, CA (US); Kunal Roy, San Francisco, CA (US)

(73) Assignee: Alchemy Insights, Inc., San Francisco, CA (US)

( * ) Notice: Subject to any disclaimer, the term of this patent is extended or adjusted under 35 U.S.C. 154(b) by 0 days.

(21) Appl. No.: 18/087,732

(22) Filed: Dec. 22, 2022

(51) Int. Cl.
*H04L 67/51* (2022.01)

(52) U.S. Cl.
CPC .................................. *H04L 67/51* (2022.05)

(58) Field of Classification Search
CPC ..................................................... H04L 67/51
USPC .......................................................... 709/224
See application file for complete search history.

(56) References Cited

U.S. PATENT DOCUMENTS

| | | | |
|---|---|---|---|
| 5,371,878 A | 12/1994 | Coker | |
| 8,086,732 B1* | 12/2011 | Volz | H04L 61/5014 709/200 |
| 8,554,929 B1* | 10/2013 | Szeto | H04L 67/1001 709/228 |
| 9,613,120 B1 | 4/2017 | Kharatishvili et al. | |
| 11,281,975 B1 | 3/2022 | Isaksson et al. | |
| 2008/0098349 A1 | 4/2008 | Lin et al. | |
| 2010/0293335 A1 | 11/2010 | Muthiah et al. | |
| 2011/0078705 A1 | 3/2011 | Maclinovsky | |
| 2011/0161488 A1* | 6/2011 | Anderson | H04L 47/22 709/224 |
| 2012/0310878 A1 | 12/2012 | Vuksan et al. | |
| 2016/0283348 A1 | 9/2016 | Golde et al. | |
| 2017/0091069 A1 | 3/2017 | Fujiwara et al. | |
| 2018/0089041 A1 | 3/2018 | Smith et al. | |
| 2018/0145836 A1 | 5/2018 | Saur et al. | |

(Continued)

FOREIGN PATENT DOCUMENTS

| | | |
|---|---|---|
| CN | 109992993 A | 7/2019 |
| CN | 112150130 A | 12/2020 |

(Continued)

OTHER PUBLICATIONS

Koul, Rohan, "Blockchain Oriented Software Testing—Challenges and Approaches", IEEE, 2018 3rd International Conference for Convergence in Technology (I2CT), The Gateway Hotel, XION Complex, Wakad Road, Pune, India. Apr. 6-8, 2018, pp. 1-6.

(Continued)

*Primary Examiner* — Zi Ye (74) *Attorney, Agent, or Firm* — Carr & Ferrell LLP (57) ABSTRACT

Systems and methods for rate limiting API service requests at an API service platform. An example method includes receiving a plurality of client service requests, determining when a safe operating threshold has been exceeded by the received requests to create a system overage or debt. In the case where it is determined that the safe operating threshold has been exceeded, determining the degree to which the safe operating limit has been exceeded, and rate limiting one or more clients transmitting service requests, identified as having the highest service request rates to eliminate the overage or debt.

20 Claims, 8 Drawing Sheets

(56) References Cited

U.S. PATENT DOCUMENTS

| | | |
|---|---|---|
| 2018/0300227 A1 | 10/2018 | Bergen |
| 2019/0171451 A1* | 6/2019 | Hardy ................. G06F 11/3433 |
| 2020/0097953 A1 | 3/2020 | Islam et al. |
| 2020/0183818 A1 | 6/2020 | Guenther et al. |
| 2020/0233858 A1 | 7/2020 | Deng et al. |
| 2020/0286026 A1 | 9/2020 | Dahod et al. |
| 2020/0374113 A1 | 11/2020 | Noam et al. |
| 2020/0396065 A1 | 12/2020 | Gutierrez-Sheris |
| 2021/0067319 A1 | 3/2021 | Chung et al. |
| 2021/0097484 A1 | 4/2021 | Ramos et al. |
| 2021/0124730 A1 | 4/2021 | Kannan et al. |
| 2021/0201328 A1 | 7/2021 | Gunther |
| 2021/0240733 A1 | 8/2021 | Kramer et al. |
| 2021/0263719 A1 | 8/2021 | Pai et al. |
| 2021/0304205 A1 | 9/2021 | Saka et al. |
| 2021/0314154 A1 | 10/2021 | Husson et al. |
| 2022/0004539 A1 | 1/2022 | De Caro et al. |
| 2022/0027348 A1 | 1/2022 | Manevich et al. |
| 2022/0027970 A1 | 1/2022 | Kim et al. |
| 2022/0159069 A1 | 5/2022 | Shirley et al. |
| 2022/0173893 A1 | 6/2022 | Basu et al. |
| 2022/0335049 A1 | 10/2022 | Hacigumus et al. |
| 2023/0098185 A1 | 3/2023 | Carver et al. |

FOREIGN PATENT DOCUMENTS

| | | |
|---|---|---|
| KR | 101796690 B1 | 11/2017 |
| WO | WO2020259352 A1 | 12/2020 |

OTHER PUBLICATIONS

Hertz, "How to Implement Caching Layers in Web3 Products", Sep. 22, 2022, productcoalition.com, https://productcoalition.com/how-to-implement-caching-layers-in-web3-products-feca245bc5c6, 6 pages.

Wang et al., "Decentralized Caching for Content Delivery Based on blockchain: A Game Theoretic Perspective", Jan. 23, 2018, arxiv.org, https://arxiv.org/pdf/1801.07604.pdf, 6 pages.

Basu et al., "Adaptive TTL-Based Caching for Content Delivery", Dec. 9, 2017, arxiv.org, https://arxiv.org/pdf/1704.04448.pdf, 27 pages.

Cecchet, "Encyclopedia of Database Systems", 2009, Springer, 212 pages.

Porru et al., "Blockchain-Oriented Software Engineering: Challenges and New Directions," IEEE—2017 IEEE/ACM 39th International Conference on Software Engineering Companion (ICSE-C), May 20-28, 2017, pp. 1-4.

* cited by examiner

SYSTEMS AND METHODS FOR ADAPTIVELY RATE LIMITING CLIENT SERVICE REQUESTS AT A BLOCKCHAIN SERVICE PROVIDER PLATFORM

CROSS-REFERENCE TO RELATED APPLICATIONS

The present utility patent application is related to U.S. patent application Ser. No. 18/083,421, filed Dec. 16, 2022 entitled "Systems and Methods for Creating a Consistent Blockchain Including Block Commitment Determinations." The present utility patent application is also related to U.S. patent application Ser. No. 18/087,761, filed Dec. 22, 2022 entitled "System and Method for High Performance Providing Fresh NFT Metadata" and U.S. patent application Ser. No. 18/087,746, filed Dec. 22, 2022 entitled "System and Method for Intelligent Testing of Blockchain Applications Using a Shadow System." The contents of each of these above-mentioned applications are incorporated herein by reference for all purposes to the extent that such subject matter is not inconsistent herewith or limiting hereof.

FIELD OF THE PRESENT TECHNOLOGY

The present disclosure pertains to wireless communications. More particularly, and not by way of limitation, embodiments disclosed herein relate to systems and methods for controlling a rate of traffic at a blockchain service provider platform.

BACKGROUND

It should not be assumed that any of the approaches described in this section qualify as prior art merely by virtue of their inclusion in this section.

Blockchain technology has gained considerable attention in the last few years, primarily as the technology behind cryptocurrencies like Bitcoin and Ethereum. Blockchain technology can be used for a wide variety of applications where ownership, transfer, and control of assets needs to be tracked.

With the advent of blockchain technology, blockchain developer platforms have been instrumental in their development and growth. Developer platforms empower companies to build scalable and reliable decentralized blockchain applications without the hassle of managing blockchain infrastructure in-house, thereby saving the blockchain developers time and money. The blockchain developer platforms provide a suite of developer tools that empower them to build applications that interact with blockchain end user systems like Bitcoin and Ethereum.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is related to various systems and methods for controlling a rate of service requests received at a blockchain service provider platform. By adaptively controlling the quantity and/or rate of service requests received by the service provider platform, service "debts" are minimized and/or prevented, thereby increasing the amount of serviceable request traffic at the service platform.

According to some embodiments, the present disclosure relates to a method comprising: receiving, over a network, a plurality of client service requests from a plurality of clients transmitting service requests; determining, upon receiving a single client service request from among the plurality of requests received, if a current total number of service requests received at the service provider platform in a prior time interval exceeds a safe operating limit; when it is determined that the safe operating limit is exceeded : (a) calculating a "debt" value formulated as the total number of service requests received in excess of the safe operating limit at the service provider platform in the prior time interval; (b) calculating a delta value formulated as the difference between a current service request rate of a first client, from among the plurality of clients, identified as having the highest current service request rate and a current service request rate of a second client, from among the plurality of clients, identified as having the second highest current service request rate; (c) determining if the delta value is greater than the debt value; (d) when it is determined that the delta value is greater than the debt value, reducing the current service request rate of the first client to a sufficient level that does not exceed the safe operating limit; and (e) when it is determined that the delta value is less than the debt value, reducing the current service request rate of the first client to match the current service request rate of the second client.

According to some embodiments, the present disclosure relates to a system comprising: a processor and a memory for storing instructions, the instructions being executed by the processor to: receive, over a network, a plurality of client service requests from a plurality of clients transmitting service requests; determining, upon receiving a single client service request from among the plurality of requests received, if a current total number of service requests received at the service provider platform in a prior time interval exceeds a safe operating limit; when it is determined that the safe operating limit is exceeded at said determining step: (a) calculating a debt value as the total number of service requests received at the service provider platform that exceed the safe operating limit; (b) calculating a delta value as the difference between a current service request rate of a first client, from among the plurality of clients, identified as having a highest current service request rate and a current service request rate of a second client, from among the plurality of clients, identified as having a second highest current service request rate; (c) determining if the delta value is greater than the debt value; (d) when it is determined that the delta value is greater than the debt value, reducing the current service request rate of the first client to a level at which the safe operating limit is no longer exceeded; and (e) when it is determined that the delta value is less than the debt value, reducing the current request rate of the first client to match the current service request rate of the second client.

According to some embodiments, the present disclosure relates to a method comprising: receiving, over a network, a plurality of client service requests from a plurality of clients transmitting service requests; calculating a rate of change in the receipt of the plurality of client service requests; determining if the calculated rate of change in the receipt of the plurality of service requests received will result in a safe operating limit being exceeded; and when it is determined that the calculated rate of change in the receipt of the plurality of client service requests will result in the safe operating limit being exceeded: (a) calculating a debt value as the total number of service requests received at the service provider platform exceeding the safe operating limit; (b) calculating a delta value as the difference between a current service request rate of a first client, from among the plurality of clients, identified as having a highest current service request rate and a current service request rate of a second client, from among the plurality of clients, identified as having a second highest current service request rate; (c) determining if the delta value is greater than the debt value; (d) when it is determined that the delta value is greater than the debt value, reducing the current service request rate of the first client to a sufficient level that does not exceed the safe operating limit; and (e) when it is determined that the delta value is less than the debt value, reducing the current service request rate of the first client to match the current service request rate of the second client.

According to some embodiments, the present disclosure relates to a system comprising: a processor and a memory for storing executable instructions, the processor for executing instructions to: receive, over a network, a plurality of client service requests from a plurality of clients transmitting service requests; calculating a rate of change in the receipt of the plurality of client service requests; determining if the calculated rate of change in the receipt of the plurality of service requests received will result in a safe operating limit being exceeded; and when it is determined that the calculated rate of change in the receipt of the plurality of client service requests will result in the safe operating limit being exceeded: (a) calculating a debt value as the total number of service requests received at the service provider platform exceeding the safe operating limit; (b) calculating a delta value as the difference between a current service request rate of a first client, from among the plurality of clients, identified as having a highest current service request rate and a current service request rate of a second client, from among the plurality of clients, identified as having a second highest current service request rate; (c) determining if the delta value is greater than the debt value; (d) when it is determined that the delta value is greater than the debt value, reducing the current service request rate of the first client to a level at which the safe operating limit is no longer exceeded; and (e) when it is determined that the delta value is less than the debt value, reducing the current request rate of the first client to match the current service request rate of the second client.

According to one aspect of the present disclosure, a non-transitory computer-readable storage medium having embodied thereon instructions, which when executed by a processor, performs steps of the methods substantially as described herein.

Other example embodiments of the disclosure and aspects will become apparent from the following description taken in conjunction with the following drawings.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

In general, various embodiments of the present disclosure are related to rate limiting service requests received at a blockchain node service provider platform.

Systems and methods are described herein for adaptively rate limiting client service requests received at a blockchain service provider platform over a network.

Blockchain node service providers offer distributed node infrastructure services for developers and enterprise clients to assist them in building blockchain-based applications. More particularly, blockchain service providers offer node infrastructure to the enterprise and developer clients as a tool that assists them to build decentralized applications faster. The blockchain service providers also offer developer tools and infrastructure to set up and manage the nodes connected to the blockchain as well as offering APIs for developers to create automated workflows.

Clients preferably choose to use a blockchain service provider that provides access to reliable, accurate, and scalable blockchain data, rather than maintaining node infrastructure themselves. A blockchain infrastructure is accessed by clients via an API service request that is transmitted over a network to an API service provider platform which provides functionality that services the blockchain end user system.

The API service provider platform provides an API that is configured to receive API service requests initiated by the clients. The API service requests received at the API service provider platform are intended to be forwarded on to blockchain end user systems via access nodes. During times of high service request traffic, the API service provider platform may reach a threshold amount of API service requests it can handle and begin to slow down. In certain cases, an overload of API requests may be enough to crash a site. To avoid an overload (debt) condition, one solution towards servicing many requests from a large number of clients is to impose rate limits, in one form or another, which limit the number of API service requests that clients can make to an API in a particular time period. Rate limits may be imposed as "hard" limits and/or "soft" limits. If a rate limit is imposed as a "hard" limit and the number of API service requests received per second exceeds the "hard" limit, each service request received in excess of the limit is aborted. However, this solution can cause problems when one or more high throughput clients consume the API and exhaust the hard limit in a short period of time. This sort of bursting puts a significant amount of load on a shared infrastructure and may affect other clients.

For context, the API service platform receives hundreds of thousands of service requests from a wide variety of clients each second. The servicing of such a large volume of service requests from various clients in time periods on the order of milliseconds to seconds is clearly beyond the scope of human capabilities. For example, API service platforms offer single clients 300 million compute units a month (CUPS) for free, which translates to about 11.5 to 12 million requests. Multiplying 11.5 to 12 million requests from each client by the number of clients making similar numbers of requests only underscores the vast processing power needed to maintain proper service levels, which extends way beyond human capabilities.

The systems and methods described herein provide computer-implemented solutions in servicing extraordinarily large volumes of service requests received from a plurality of clients at a service provider platform. The methods and systems described herein solve problems associated with service request overloads which occur, primarily, but not exclusively, from the receipt of the large volumes of service requests received at the service provider platform, that can number in the hundreds of thousands in time spans on the order of milliseconds to seconds. In one embodiment, the problem of service request overloads is solved by adaptively reducing a client's current service request rate to match the current service request rate of a second client having a comparatively lower current service request rate. By lowering the service request rates of certain clients, the rate limiting processor functioning is improved by fully allocating computer resources to servicing requests and having to dedicate computer resources to mitigating request overloads. Further, by adaptively rate limiting certain clients, the possibility of a system crash is averted. Further, by solving the problem of debts at the service provider platform, reliance on client side rate limiting solutions is reduced or eliminated.

In various embodiments, a rate limiting processor capable of executing instructions for performing the methods is disclosed herein. As described below, in various embodiments, the rate limiting processor receives, monitors and analyzes thousands of incoming service requests from a plurality of clients in successive time periods, which may be on the order of milliseconds or seconds. Based on the volume and rate of service requests received, rate limiting methods of the present invention may be implemented. The rate limiting measures advantageously prevent or mitigate the occurrence of service request debts and system crashes at the service provider platform, thereby improving the functioning of the rate limiting processor, as will be described below.

Terminology

The term "queries per second" is defined as the number of service requests transmitted from a client to the service provider platform.

The term "CUPS" is defined herein as compute units per second. Each query is assigned a weight that is measured in "compute units". For example, one query may have an associated cost of 26 compute units, while another query may have an associated cost of 200 compute units.

The terms "safe operating limit" and "hard limit" are system limits based on the amount of load on our system that each client is generating, which is represented by compute units.

The term "debt" is defined herein as the difference in CUPS between what clients are currently sending and a volume of CUPS that the system would prefer to operate at for optimal performance. For example, as clients send service requests, the service requests are evaluated by the system in terms of their associated weight values, measured in CUPS.

The term "overage" is defined herein as a measure of how much a client CUPS are above a client's "stated rate limit" which is an agreed upon CUP rate between the client and the system. For example, if it is agreed that a client can make 30 CUPS as a product offering and the client is currently making 50 CUPS, then the client has an "overage" of 20 CUPS.

Example Embodiments

Figure 1:
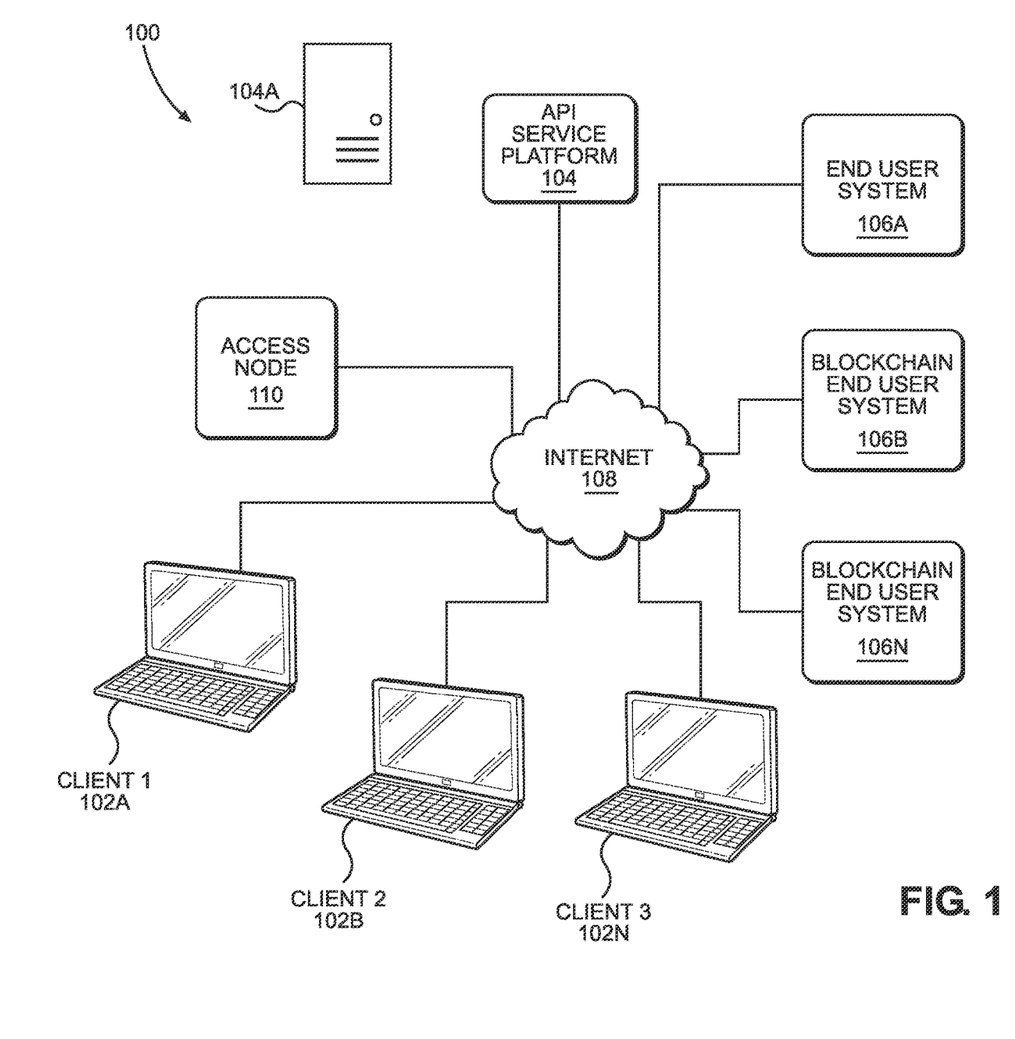
FIG. 1 is a schematic diagram of an example wireless environment where aspects of the present disclosure can be implemented for use.

Turning now to the drawings, FIG. 1 depicts an example system architecture 100 where aspects of the present disclosure are implemented. The system architecture 100 comprises a plurality of clients 102A-102N, an API service platform 104, server computer 104A, access node 110, and a plurality of blockchain end user systems 106A-106N that are all in communication via a network 108 such as internet.

A computing device or computing system on which the rate limiting system of the present disclosure can be implemented may comprise, for example, a server computer 104A residing at an API service platform 104 or any other system providing computing capability. Server computer 104A comprises a processor and a memory. The memory stores instructions that can be executed by the processor to perform the various methods disclosed herein. Server computer 104A is configured to perform improved rate limiting processes as disclosed herein.

The plurality of clients 102A-102N can include any suitable computing device for any client that desires to interact with the blockchain end user systems 106A-106N. The plurality of clients 102A-102N transmit their API service requests to server computer 104A at API service platform 104 over a network 108 which may comprise a single network or a plurality of networks, as would be known to one of ordinary skill in the art. For example, network 108 may include any one or a combination of multiple different types of networks, such as cable networks, the Internet, wireless networks, and other private and/or public networks. In some instances, the network may include cellular, Wi-Fi, or Wi-Fi direct. Any suitable network may be used herein.

Figure 2:
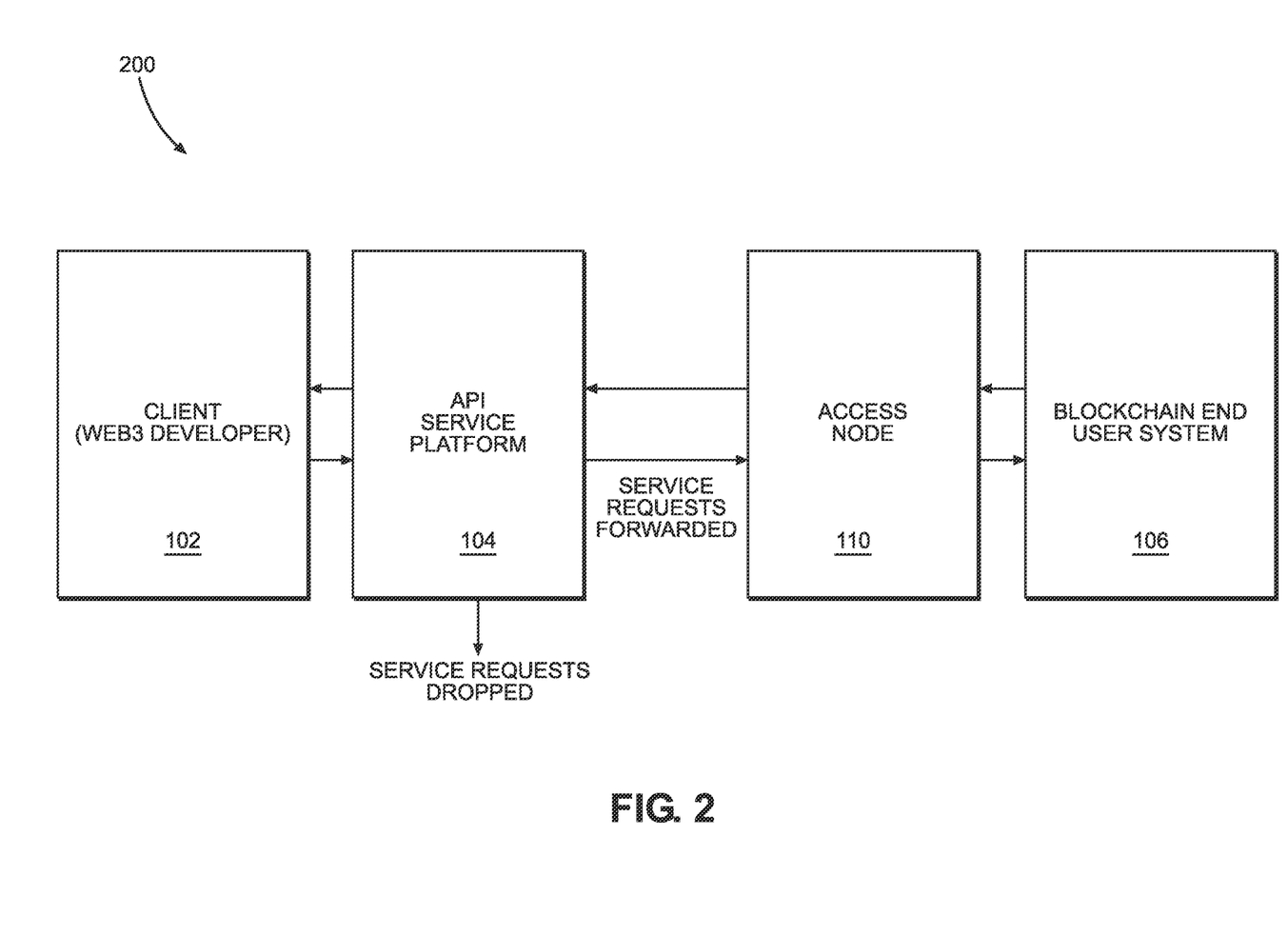
FIG. 2 is a schematic diagram of an ordered message flow conducted in the example wireless environment of FIG. 1.

Referring now to FIG. 2, which illustrates a flow 200 of API service requests in the example system architecture FIG. 1 where aspects of the present disclosure are implemented. The flow 200 of API service requests originates with the plurality of clients 102A-102N which transmit a plurality of API service requests to API service platform 104, where a majority of the API service requests are forwarded on to the blockchain end user systems 106A-106N, via access node 110. Depending upon the rate and quantity of API service requests received at the API service platform 104, some number of API service requests received at the API service platform 104 may be dropped by the API service platform 104. A dropped service request is defined herein as a request that is not forwarded from a client, via a service platform, on to an access node 110.

Figure 3:
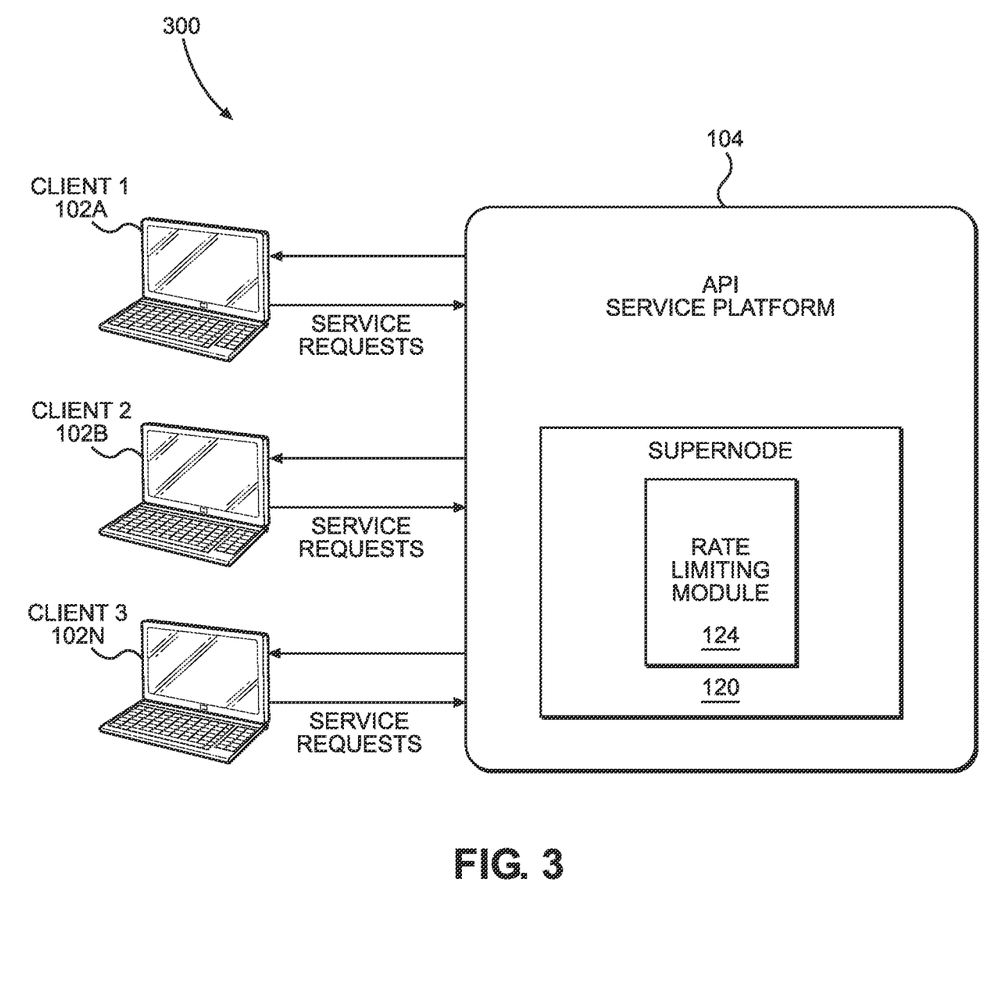
FIG. 3 is a schematic illustration of an API service provider platform of the present disclosure including a rate limiting processor.

FIG. 3 is a simplified schematic illustration 300 of the exemplary API service platform 104 of FIGS. 1 and 2. The API service platform 104 comprises a supernode architecture 120 that includes a rate limiting processor 124. The supernode architecture 120 is a blockchain-native architecture, specifically designed for Web 3.0, that delivers peak reliability by powering each piece of the node functionality with dedicated, distributed infrastructure.

The supernode architecture 120 ensures real-time data correctness with a proprietary coordinator service and also scales quickly and seamlessly and includes enhanced API (application programming interface) methods and upgraded WebSockets, to continuously listen for changes and automatically handle reconnection and backfilling missed events. WebSockets allow a web browser that supports the WebSockets protocol to connect to a server application using a persistent TCP connection. The rate limiting processor 124 of the supernode architecture 120 is operable to execute on a hardware processor, such as server computer 104A, to execute the methods of the present invention according to the described embodiments.

The rate limiting processor 124 utilizes a pricing model for charging clients sending service requests. The pricing model calculates compute units for every service request's raw method, with the average request costing 25 compute units (CUPS) and a compute unit range of between 10-2983 compute units per request. CUPS are a measure of the number of compute units used per second when making requests. Since each request is weighted differently, pricing is based on the total compute units used rather than the number of requests. For example, if you send one eth_blockNumber (10 CUs), two eth_getLogs (75 CUs), and two eth_call (26 CUs) requests in the same second, you will have a total of 310 CUPS. Pricing models for sending requests are generally segregated into tiers with a first tier pricing model covering 13.2 requests per second and 12 million requests per month and a growth tier pricing model offering 26.4 requests per second and 16.2 million requests per month.

Figure 4:
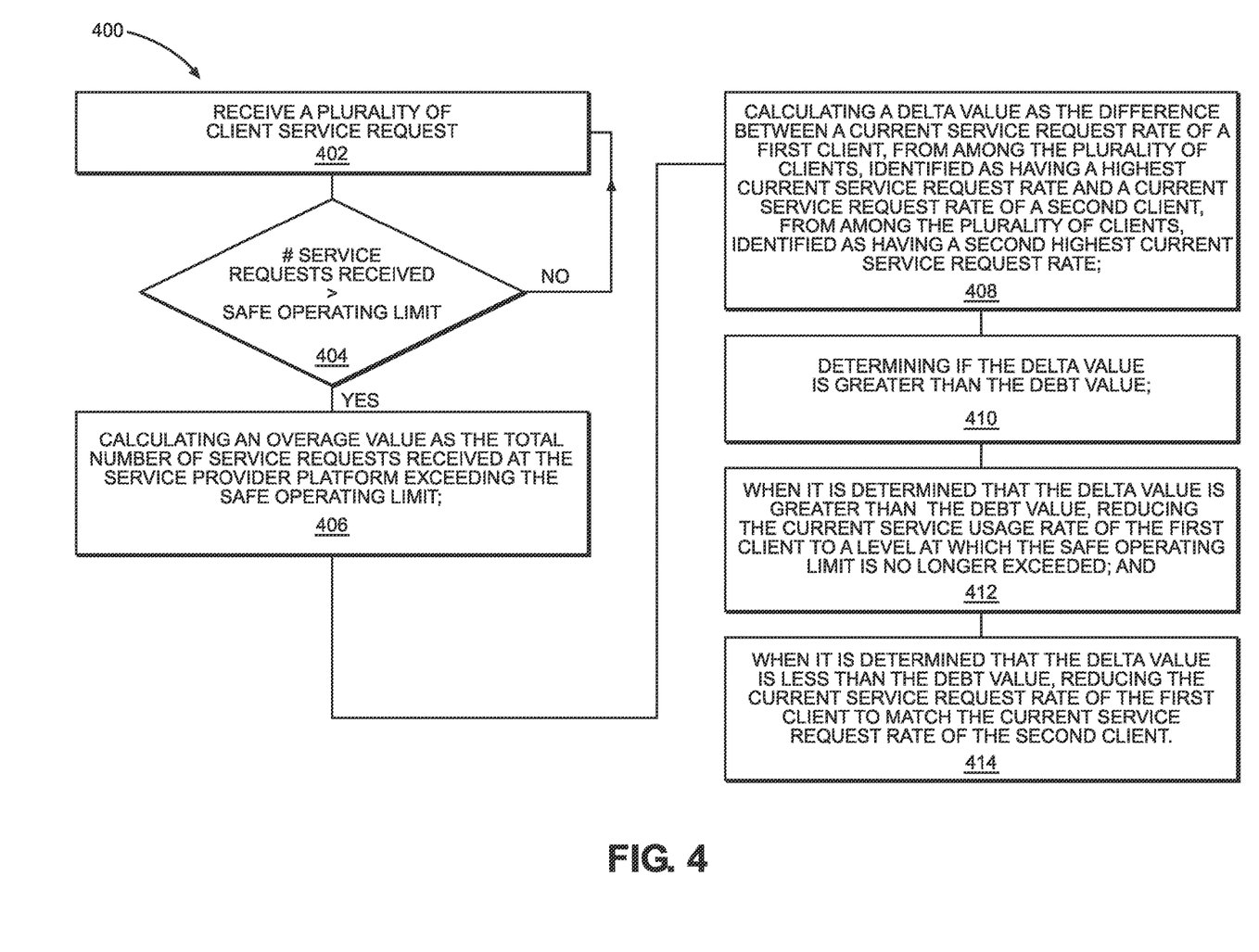
FIG. 4 is a flowchart of an example method of the present disclosure pertaining to a first method of rate limiting API service requests, according to one embodiment.

FIG. 4 is a flowchart of an example method 400 of the present disclosure. In general, the method 400 involves minimizing and/or preventing service request debts at a service provider platform. The method 400 may be performed, for example, at the API service platform 104 of FIG. 2.

The method 400 includes at step 402, receiving a plurality of client API service requests from a plurality of clients over a network transmitting service requests. At step 404, a determination is made whether a current total number of service requests received at the service provider platform over a prescribed time interval exceeds a safe operating limit. The safe operating limit, as defined herein, refers to a limit, below which, all service requests received at the service provider platform, will be serviced at the service provider platform and above which, certain clients will be rate limited. When it is determined that the safe operating limit is exceeded at step 404: At step 406, calculating a debt value as the total number of service requests received at the service provider platform exceeding the safe operating limit. At step 408, calculating a delta value as the difference between a current service request rate of a first client, from among the plurality of clients, identified as having the highest current service request rate and a current service request rate of a second client, from among the plurality of clients identified as having the second highest current service request rate. At step 410, determining if the calculated delta value is greater than the calculated debt value. At step 412, when it is determined that the delta value is greater than the debt value, reducing the current service request rate of the first client to a sufficient level such that the safe operating limit is no longer exceeded. At step 414, when it is determined that the delta value is greater than the debt value, reducing the current request rates of the first and second clients to a level at which the safe operating limit is no longer exceeded.

Figure 5:
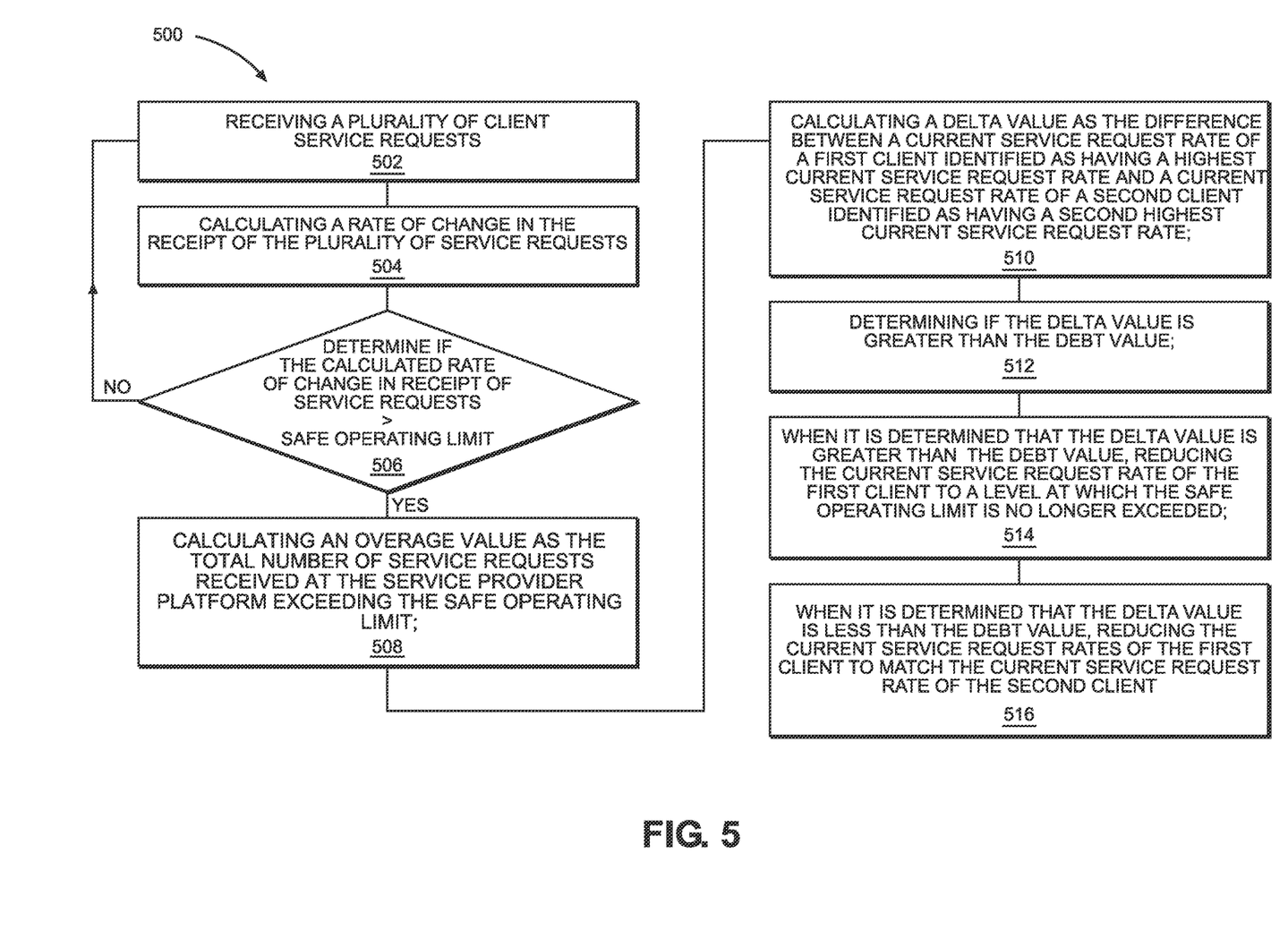
FIG. 5 is a flowchart of another example method of the present disclosure pertaining to a second method of rate limiting API service requests, according to one embodiment.

FIG. 5 is a flowchart of an example method 500 of the present disclosure. The method 500 may be performed at a service provider platform, such as the API service platform 104 of FIG. 2.

The method 500 includes at step 502, receiving a plurality of client API service requests at a service platform, over a network, from a plurality of clients transmitting service requests intended for blockchain end systems, such as the blockchain end systems of FIG. 2. At step 504, the method 500 includes, calculating, a rate of change in the receipt of the plurality of service requests received from the plurality of clients. At step 506, the method includes, determining if the rate of change in the receipt of the plurality of service requests will result in a safe operating limit being exceeded. When it is determined that the number of service requests received in the first time period will exceed the safe operating limit, the method includes: at step 508, calculating a debt value as the total number of service requests received at the service provider platform in excess of the safe operating limit. At step 510, the method includes, calculating a delta value as the difference between a current service request rate of a first client, from among the plurality of clients, identified as having a highest current service request rate and a current service request rate of a second client, from among the plurality of clients, identified as having a second highest current service request rate. At step 512, the method includes determining if the delta value is greater than the debt value. At step 514, the method includes, when it is determined that the delta value is greater than the debt value, reducing the current service request rate of the first client to a level at which the safe operating limit is no longer exceeded. At step 516, the method includes, when it is determined that the delta value is less than the debt value, reducing the current request rates of the first and second clients to a level at which the safe operating limit is no longer exceeded.

Illustrative Example

Figure 6:
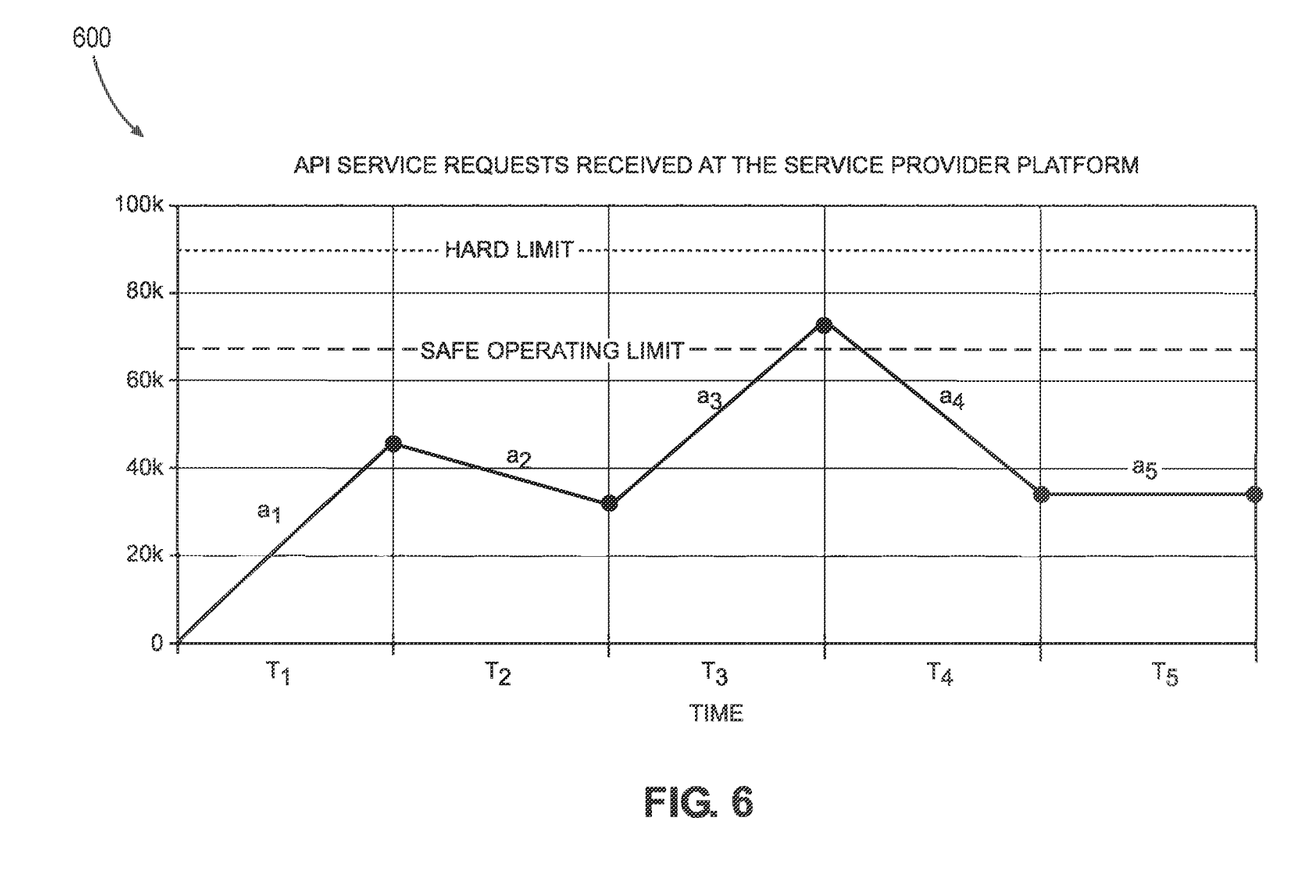
FIG. 6 is an exemplary graph illustrating the method of the present disclosure as illustrated in FIG. 4, according to one embodiment.

FIG. 6 depicts a simplified graphical representation (e.g., plot, graph, and the like) 600 of API service requests received at a service provider platform for an exemplary number of discrete time periods (e.g., T=1 to 5) for ease of explanation. The plot is exemplary only and the technology is not limited to the examples provided in the plot.

Referring to FIG. 6, by way of non-limiting example, a plurality of clients transmit their service requests, which can be API service requests, to the service provider platform, where they are collected and analyzed by the rate limiting processor 124. The plot 600 illustrates that service requests are continuously being received at the service provider platform at each time interval. The requests can vary in both quantity and rate of receipt.

Rate limiting processor 124, as shown in FIGS. 1 and 2, is configured to execute software instructions, when needed, directed to executing the rate limiting methods 400, 500 described herein, including, inter alia, collecting, analyzing and rate limiting the service requests to both mitigate and/or prevent the occurrence of debts.

The particular rate limiting methods 400, 500, i.e., the first and second embodiments, as described herein with regard to FIGS. 4 and 5, will now be further explained with regard to FIG. 6, by way of example only.

The example scenario illustrated in FIG. 6 can be carried out by the methods 400, 500 shown respectively in FIGS. 4 and 5, executed in the system shown in FIGS. 1-3. The X-axis refers to time, divided into discrete time periods, T=1-5 and the Y-axis refers to a continuous plot of service requests received at a service request platform over the discrete time periods T=1-5. The selected time intervals are arbitrary and only serve to facilitate the explanation of the operation of the rate limiting processor.

In general, service requests are received from a plurality of clients on a continuous basis. The methods 400, 500 described herein describe operations performed on each received service request on an individual basis. In other words, while the methods 400, 500 describe receiving a plurality of client service requests, e.g., steps 402, 502, the service requests are individually analyzed and processed at the service provider platform.

FIG. 6 includes two system limits that enable the operation of the methods 400, 500. The two system limits include the safe operating limit and the hard rate limit. The safe operating limit is a warning limit that when exceeded notifies the rate limiting processor that the number of service requests being received at a point in time exceeds the system's capacity to service all requests resulting in the creation of a service backlog. The methods described herein are designed to recognize the creation of a backlog or the possibility of the creation of a backlog at a future point in time. Thus, the methods are configured to take necessary restorative and/or preemptive measures to mitigate or prevent the backlog. The hard rate limit, when breached by the number of service requests being received at the service provider platform, provides a further warning signal that more drastic measures must be employed to eliminate the breach given that a system crash may result from a hard limit breach continuing for a prolonged period of time. In this regard, the methods 400, 500 further contemplate steps to be performed in the event the hard rate limit is breached. These steps include, determining whenever the hard rate limit is breached. In response to a breach of the hard rate limit, reducing the rate limits of all clients to their assigned "stated rate limits." Upon reducing the rate limits of all clients to their assigned "stated rate limits" making a further determination regarding whether the hard rate limit continues to be breached. In the case where the hard rate limit continues to be breached, further determining the percentage amount by which the hard rate limit is being breached and further reducing the "stated rate limits" of all clients by the same percentage amount.

First Embodiment

In a first embodiment, as described above with reference to FIG. 4, according to the method 400, the rate limiting processor 124 determines for each service request received at the service provider platform whether or not the safe operating limit has been exceeded. In the case where the safe operating limit has been exceeded, the rate limiting processor 124 further determines the degree to which the safe operating limit has been exceeded, referred to herein as a debt value. The degree of excess corresponds to some number of service requests in excess of a preferred amount to be serviced. The method then compares the magnitude of the debt value with a delta value. The delta value is calculated as the numerical difference between the highest service request rate of a first client and the second highest service request rate of a second client. In an embodiment, the rate limiting processor may access a data repository that stores updated service request rate information for each client. The rate limiting processor accesses this information to compute the delta values, as needed. The method then determines if the computed delta value is greater than the computed debt value. In the event the computed delta value is greater than the debt value, only a single client identified as having the highest determined service request rate will be rate limited. If, however, the computed delta value is determined to be less than the computed debt value, then the method reduces the current service request rate of the first client to match a current service request rate of the second client. In the event the debt is not sufficiently reduced or otherwise eliminated after rate limiting has been imposed on the first two clients, then rate limiting will be imposed on additional clients whose service request rates are highest among all clients transmitting service requests.

Referring again to FIG. 6, it is shown that by implementing the rate limiting methods 400, 500 as described herein at time period T=3, a resultant decrease in the total number of service requests received is observed in subsequent time periods, e.g., T4, thereby eliminating the service debt (overage).

Second Embodiment

In accordance with the second embodiment, as described above with reference to FIG. 5, according to method 500, upon receiving each service request at the service provider platform, a rate of change in the receipt of service requests is calculated to determine whether the rate of change in the receipt of the service requests will result in the total number of service requests exceeding the safe operating limit. When it is determined that the calculated rate of change of receipt of the service requests will imminently result in the service requests exceeding the safe operating limit, a debt value is calculated, a delta value is calculated, and the delta value is compared with the debt value to determine which is greater. When it is determined that the delta value is greater than the debt value, the current request rate of the client with the highest number of requests is reduced to a level at which the safe operating limit will no longer be exceeded. Otherwise, when it is determined that the delta value is less than the debt value, a current request rate of the first client will be reduced to the current service request rate of a second client. The first and second clients being identified as clients, from among all clients transmitting service requests, having the respective highest and second highest client service request rates. In one aspect, the rate limiting processor may query a data repository that stores data related to each client's current service request rate to determine the current service request rates for all clients. The data may be recorded over any number of predetermined time intervals and may be accumulated on a rolling basis over the predetermined time intervals. For example, data may be recorded every 10 milliseconds. Cumulative totals may be aggregated over some number of intervals. In a preferred embodiment, cumulative totals are collected over the most recent 10 time intervals. The time intervals over which the data is collected may range in various embodiments substantially from about 1 millisecond to about 1 second.

Figure 7:
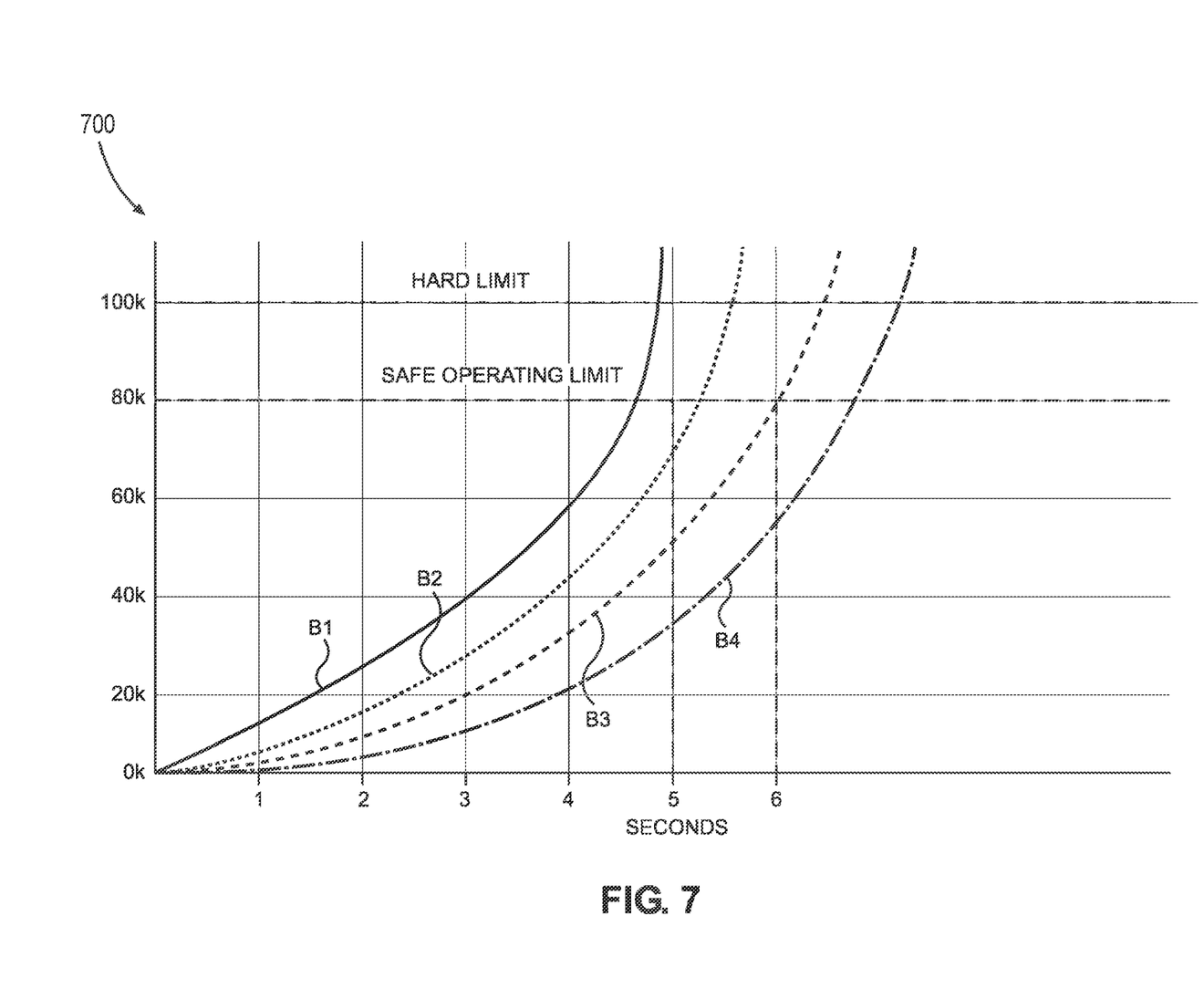
FIG. 7 is an exemplary graph illustrating the method of the present disclosure as illustrated in FIG. 4, according to one embodiment.

FIG. 7 depicts a simplified graphical representation (e.g., plot, graph, and the like) 700 of four plots B1-B4, illustrating, by way of example, processes associated with the second embodiment. Specifically, FIG. 7 illustrates variations in the receipt and corresponding rate of change in the continuous receipt of a plurality of service requests at a service platform from one or more clients over an exemplary time period (e.g., T=1 to 5) for ease of explanation.

Plot B1 illustrates the receipt of service requests from all clients at the service provider platform with the steepest rate of change of receipt. Plots B2-B4 illustrate the receipt of service requests at the service provider platform with successively lower rates of change in the receipt of service requests. The differences in the rate of change of receipt of service requests, as exemplified by these graphs, directly determine what actions will be taken by the rate limiting processor to mitigate and/or prevent debts at the service provider platform. Briefly, whenever the rate of change of requests exceeds the safe operating limit, rate limits will be imposed on one or more clients, as best described in relation to method 500.

A rate limiting processor, such as rate limiting processor 124, as shown in FIGS. 2 and 3 utilize service request information, similar to what is presented by way of example in plots B1-B4 as shown in FIG. 6, to determine whether or not to reduce one or more clients' service request rate to prevent or mitigate a debt. The method by which one or more clients' service request rates are reduced was discussed supra in relation to the first and second embodiments shown in methods 400, 500.

Thus, methods and systems for adaptively rate limiting API service requests at an API service platform have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

Thus, methods and systems for dynamically rate limiting API service requests to a set of blockchain resources have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

Figure 8:
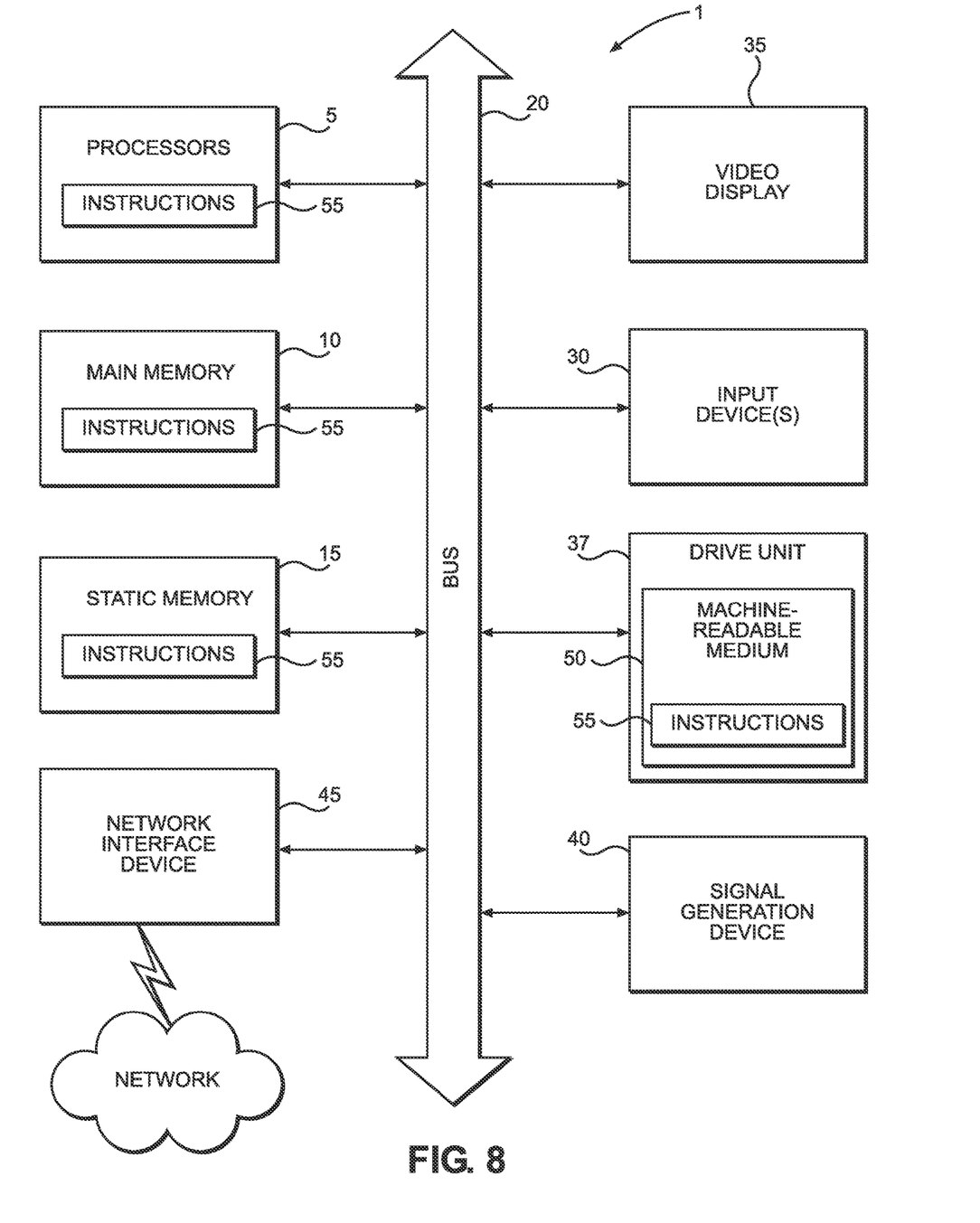
FIG. 8 is a schematic diagram of an exemplary computer system that is used to implement embodiments according to the present technology.

FIG. 8 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an Internet-of-Things device or system, a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

The components provided in the computer system 1 of FIG. 8 are those typically found in computer systems that may be suitable for use with embodiments of the present disclosure and are intended to represent a broad category of such computer components that are well known in the art. Thus, the computer system 1 can be an Internet-of-Things device or system, a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accordance with the technology. Those skilled in the art are familiar with instructions, processor(s), and storage media.

In some embodiments, the computer system 1 may be implemented as a cloud-based computing environment, such as a virtual machine operating within a computing cloud. In other embodiments, the computer system 1 may itself include a cloud-based computing environment, where the functionalities of the computer system 1 are executed in a distributed fashion. Thus, the computer system 1, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications, as well as wireless communications (both short-range and long-range). Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for rate limiting service requests received at a blockchain service provider platform, comprising:

receiving, over a network, a plurality of client service requests from a plurality of clients transmitting service requests;

determining, for a first service request, if a total number of service requests received at the service provider platform in a prior time interval exceeds a safe operating limit;

when it is determined that the safe operating limit is exceeded at said determining step:
  (a) calculating a "debt" value formulated as the total number of service requests received in excess of the safe operating limit at the service provider platform in the prior time interval;
  (b) calculating a delta value as a difference between a current service request rate of a first client, from among the plurality of clients, identified as having a highest current service request rate and a current service request rate of a second client, from among the plurality of clients, identified as having a second highest current service request rate;
  (c) determining if the delta value is greater than the debt value;
  (d) when it is determined that the delta value is greater than the debt value, reducing the current service request rate of the first client to a level not to exceed the safe operating limit; and
  (e) when it is determined that the delta value is less than the debt value, reducing the current service request rate of the first client to match the current service request rate of the second client.

2. The computer-implemented method of claim 1, further comprising:
  computing the delta value and the debt value for a subsequent service request;
  determining if the delta value is greater than the debt value; and
  when it is determined that the delta value is less than the debt value, reducing the current service request rates of the first and second clients to a current service request rate of a third client, wherein the third client is identified as having a third highest service request rate from among all clients.

3. The computer-implemented method of claim 1, further comprising:
  computing the delta value and the debt value for a subsequent service request;
  determining if the delta value is greater than the debt value; and
  when it is determined that the delta value is greater than the debt value, reducing the current service request rates of the first and second clients to a level not to exceed the safe operating limit.

4. The computer-implemented method of claim 1, wherein the safe operating limit is a system threshold indicator for indicating when a predetermined number of requests received at the service provider platform is exceeded.

5. The computer-implemented method of claim 1, wherein the prior time interval is substantially in a range of about 10 milliseconds to about 1 second.

6. The computer-implemented method of claim 1, wherein the plurality of clients comprises a subset of all transmitting clients having the highest service request rates.

7. A system for rate limiting service requests received at a blockchain service provider platform, comprising:
  a processor;
  a memory for storing executable instructions;
  the processor executing instructions to:
    receive, over a network, a plurality of client service requests from a plurality of clients transmitting service requests;
    determine, for each received service request, if a current total number of service requests received at the service provider platform from all clients exceeds a safe operating limit;
    when it is determined that the safe operating limit is exceeded at said determination step:
      (a) calculate a debt value as a total number of service requests received at the service provider platform that exceed the safe operating limit;
      (b) calculate a delta value as the difference between a current service request rate of a first client, from among the plurality of clients, identified as having a highest current service request rate and a current service request rate of a second client, from among the plurality of clients, identified as having a second highest current service request rate;
      (c) determine if the delta value is greater than the debt value;
      (d) when it is determined that the delta value is greater than the debt value, reduce the current service request rate of the first client to a level not to exceed the safe operating limit; and
      (e) when it is determined that the delta value is less than the debt value, reducing the current service request rate of the first client to match the current service request rate of the second client.

8. The system of claim 7, wherein the processor further executes instructions to:
  compute the delta value and the debt value for a second service request;
  determine if the delta value is greater than the debt value; and
  when it is determined that the delta value is less than the debt value, reducing the current service request rates of the first and second clients to a current service request rate of a third client, wherein the third client is identified as having a third highest service request rate from among all clients.

9. The system of claim 7, wherein the processor further executes instructions to:
  compute the delta and debt values for a second service request;
  when it is determined that the delta value is greater than the debt value, reducing the current service request rates of the first and second clients to a level not to exceed the safe operating limit.

10. The system of claim 7, wherein the safe operating limit is a system threshold indicator for indicating when a predetermined number of requests received at the service provider platform is exceeded.

11. The system of claim 7, wherein the step of determining if the current total number of service requests received at the service provider platform from all clients is for a prior time interval, and the prior time interval is substantially in a range of about 10 milliseconds to about 1 second.

12. The system of claim 7, wherein the plurality of clients comprises a subset (N) of clients, identified as having the highest service request rates from among all transmitting clients (M), where N<M.

13. A computer-implemented method for limiting API service requests received at a blockchain service provider platform, comprising:
  receiving, over a network, a plurality of client service requests from a plurality of clients transmitting service requests;

calculating, for each received service request, a rate of change in the receipt of the plurality of client service requests;

determining, for each received service request, if the calculated rate of change in the receipt of the plurality of client service requests received will result in a safe operating limit being exceeded; and when it is determined that the calculated rate of change in the receipt of the plurality of client service requests will result in the safe operating limit being exceeded:
  (a) calculating a debt value as a total number of service requests received at the service provider platform exceeding the safe operating limit;
  (b) calculating a delta value as a difference between a current service request rate of a first client, from among the plurality of clients, identified as having a highest current service request rate and a current service request rate of a second client, from among the plurality of clients, identified as having a second highest current service request rate;
  (c) determining if the delta value is greater than the debt value;
  (d) when it is determined that the delta value is greater than the debt value, reducing the current service request rate of the first client to a level not to exceed the safe operating limit; and
  (e) when it is determined that the delta value is less than the debt value, reducing the current service request rate of the first client to match the current service request rate of the second client.

14. The computer-implemented method of claim 13, further comprising:

computing the delta and debt values for a subsequent service request;

determining if the delta value is greater than the debt value; and when it is determined that the computed delta value is less than the debt value:
  reducing the current service request rates of the first and second clients to a current service request rate of a third client, wherein the third client is identified as having a third highest service request rate from among all clients.

15. The computer-implemented method of claim 13, further comprising:

computing the delta and debt values for a subsequent service request;

determining if the delta value is greater than the debt value; and when it is determined that the delta value is greater than the debt value, reducing the current service request rates of the first and second clients to a level not to exceed the safe operating limit.

16. The computer-implemented method of claim 13, wherein the safe operating limit comprises a service request boundary, which when exceeded results in a reduction of a current service request rate of one or more clients from among the plurality of clients.

17. The computer-implemented method of claim 13, wherein the step of determining, for each received service request, if the calculated rate of change in the receipt of the plurality of client service requests received will result in a safe operating limit being exceeded is for a predetermined time interval, and the predetermined time interval is substantially in a range of about 1 millisecond to about 1 second.

18. A system, for rate limiting service requests received at a blockchain service provider platform comprising:

a processor;

a memory for storing executable instructions;

the processor executing instructions to:
  receive, over a network, a plurality of client service requests from a plurality of clients transmitting service requests;
  calculate, for each received service request, a rate of change in the receipt of the plurality of client service requests;
  determine, for each received service request, if the calculated rate of change in the receipt of the plurality of client service requests received will result in a safe operating limit being exceeded; and
  when it is determined that the calculated rate of change in the receipt of the plurality of client service requests will result in the safe operating limit being exceeded:
    (a) calculate a debt value as a total number of service requests received at the service provider platform exceeding the safe operating limit;
    (b) calculate a delta value as a difference between a current service request rate of a first client, from among the plurality of clients, identified as having a highest current service request rate and a current service request rate of a second client, from among the plurality of clients, identified as having a second highest current service request rate;
    (c) determine if the delta value is greater than the debt value;
    (d) when it is determined that the delta value is greater than the debt value, reduce the current service request rate of the first client to a level not to exceed the safe operating limit; and
    (e) when it is determined that the delta value is less than the debt value, reduce the current request rate of the first client to match the current service request rate of the second client.

19. The system of claim 18, wherein the processor further executes instructions to:

recompute the delta and debt values for a subsequent service request;

determine if the delta value is greater than the debt value; and when it is determined that the delta value is less than the debt value, reduce the current service request rates of the first and second clients to a current service request rate of a third client, wherein the third client is identified as having a third highest service request rate from among all clients.

20. The system of claim 18, wherein the processor further executes instructions to:

compute the delta and debt values for a subsequent service request;

determine if the delta value is greater than the debt value; and when it is determined that the delta value is greater than the debt value,
  reduce the current service request rates of the first and second clients to a level not to exceed the safe operating limit.

* * * * *

UNITED STATES PATENT AND TRADEMARK OFFICE
CERTIFICATE OF CORRECTION

| | |
|---|---|
| PATENT NO. | : 11,750,711 B1 |
| APPLICATION NO. | : 18/087732 |
| DATED | : September 5, 2023 |
| INVENTOR(S) | : David Philipson and Kunal Roy |

It is certified that error appears in the above-identified patent and that said Letters Patent is hereby corrected as shown below:

In the Claims

In Column 16, Line 10, regarding Claim 7, the phrase "delta value as the difference" should read "delta value as a difference".

Signed and Sealed this
Thirtieth Day of January, 2024

Katherine Kelly Vidal
*Director of the United States Patent and Trademark Office*